UNITED STATES PATENT OFFICE.

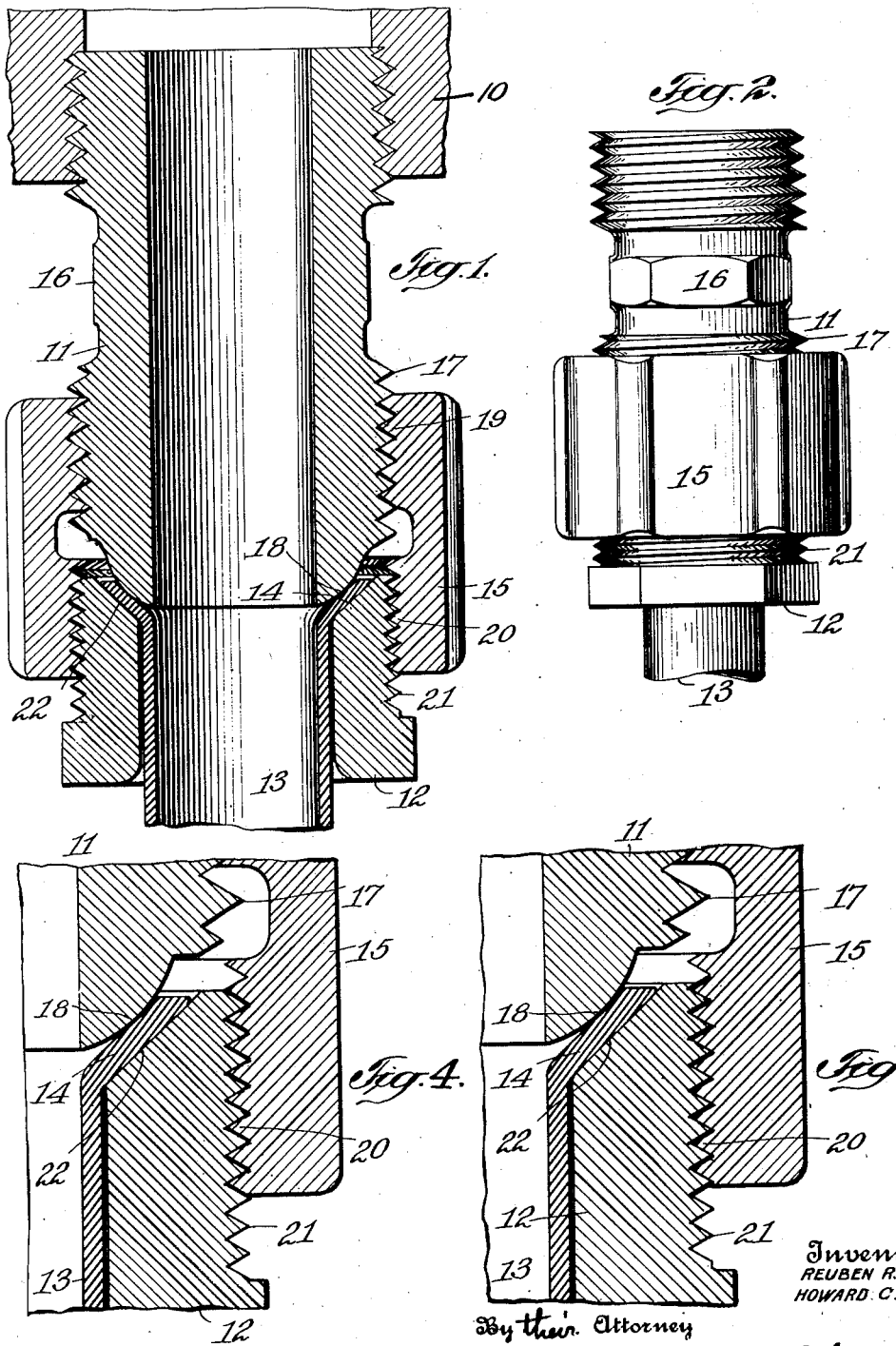

REUBEN R. ROW AND HOWARD C. DAVIS, OF ELIZABETH, NEW JERSEY, ASSIGNORS TO AMERICAN MARINE EQUIPMENT CORPORATION, OF NEW YORK, N. Y., A CORPORATION OF DELAWARE.

COUPLING AND THE LIKE.

1,326,970.  Specification of Letters Patent.  Patented Jan. 6, 1920.

Application filed March 14, 1917. Serial No. 154,671.

*To all whom it may concern:*

Be it known that we, REUBEN R. Row and HOWARD C. DAVIS, citizens of the United States, and residents of Elizabeth, in the county of Union and State of New Jersey, have invented certain new and useful Improvements in Couplings and the like, of which the following is a specification.

The invention relates to couplings for use, among other purposes, in connecting pipes with the manifolds or headers in evaporators, feed-water heaters and similar apparatus, in which the manifolds or headers are usually of cast metal and the pipes or coils of copper.

One object of the invention is to provide a coupling which will insure the formation of a steam tight joint at the end or ends of the pipe or coil, and a further purpose of the invention is to provide efficient coupling means which may be readily applied to use and also be conveniently loosened, when necessary, to release the pipe held thereby.

A satisfactory embodiment of our invention is described in detail hereinafter and illustrated in the accompanying drawings, in which:

Figure 1 is a vertical section through the coupling members, a portion of a copper pipe and a portion of a manifold or header or part connected therewith;

Fig. 2 is a side elevation, on a smaller scale, of the coupling members detached from the manifold or header, and Figs. 3 and 4 are vertical sections, on an enlarged scale, through a portion of the pipe and coupling members.

In the drawings, 10 designates a portion of a manifold, header or the like, 11 a nipple, 12 an externally threaded bushing, 13 a piece of seamless copper pipe whose outwardly flared or flanged end 14 is clamped between facing portions of said nipple and bushing, and 15 a lock nut connecting said nipple and bushing.

The nipple 11 is tubular and externally threaded at its opposite end portions, and the upper or outer end of the nipple is screwed into a threaded opening in the manifold 10. The nipple 11 has between its threaded end portions a polygonal section 16 adapted to receive a wrench or like tool.

Below the lower threads 17, the end of the nipple 11 is tapered downwardly and inwardly on converging curved lines and this tapered end of the nipple not only enters the bushing 12 but affords an annular convex bearing surface 18 to engage the flange 14 on the pipe 13, and we regard said bearing 18 as of considerable importance in securing a steam-tight joint.

The lock-nut 15 has at one end an internal thread 19 to engage and screw on the corresponding thread 17 of the nipple and at its other end an internal thread 20 of different pitch from the thread 19 and adapted to receive the external thread 21 on the bushing 12.

The upper end of the bushing 12 is tapered upwardly and outwardly, as at 22, to afford an annular inclined seat for the flange 14 on the pipe 13 and against which seat said flange is securely bound by the engagement of the convex bearing 18 with said flange. The flange 14 is pinched or clamped between the seat 22 and bearing 18.

In practice, the nipple 11 is screwed into the manifold 10 and the lock-nut 15 is screwed upon the nipple; the bushing 12 is slipped upon the pipe 13 and thereupon the end of the pipe is flanged outwardly as at 14, after which the bushing 12, with the seat 22 against the flange 14 of the pipe, is screwed into the lock-nut 15 until said flange is very firmly pressed against the convex bearing surface 18 of the nipple. We then in order to insure the formation of a steam-tight joint at the end of the pipe and the retention of the bushing firmly in place, give the lock-nut 15 a slight turn upwardly on the nipple 11,—this having the effect of binding the nipple, pipe, bushing and nut very firmly together. This final turning action of the nut 15 is necessarily slight but it is very effective, since the threads 19, 20 on the nut are of different pitch and correspond with the threads 17, 21 on the nipple and bushing, respectively, and which threads differ in pitch. Fig. 3 shows the relation of the parts of the coupling when the bushing 12 is screwed upwardly to bind the flange 14 of the pipe 13 against the bearing surface 18 of the nipple or spud 11, and Fig. 4 indicates the final position of the several parts of the coupling when the nut 15 is given its slight final turning action upwardly on the nipple 11 to lock the several parts of the coupling together.

What we claim as our invention and desire to secure by Letters-Patent, is:

1. A coupling for connecting a pipe to a manifold and the like, comprising, in combination, a manifold having an internally threaded opening, a nipple externally threaded at both ends and at one end screwed into said opening and at the other end having an inwardly extending beveled edge, an internally threaded nut screwed upon said other end of said nipple, an externally threaded bushing screwed into the outer end of said nut and having an inner outwardly extending beveled end edge, and a pipe whose end is within said bushing and whose end edge portions are flared outwardly and held between the opposing beveled surfaces of said nipple and bushing.

2. A coupling for connecting a pipe to a manifold and the like, comprising, in combination, a manifold having an internally threaded opening, a nipple externally threaded at both ends and at one end screwed into said opening and at the other end having an inwardly extending beveled edge, an internally threaded nut screwed upon said other end of said nipple, an externally threaded bushing screwed into the outer end of said nut and having an inner outwardly extending beveled end edge, and a pipe whose end is within said bushing and whose end edge portions are flared outwardly and held between the opposing beveled surfaces of said nipple and bushing, said end edge of said nipple being beveled on convex lines so as to afford an annular convex bearing surface against which the bushing may bind the flange of the pipe.

3. A pipe joint coupling comprising a nipple having a threaded exterior and beveled end surface, an internally threaded nut screwed on said nipple, an externally threaded bushing screwed into said nut and having a beveled end edge opposing the beveled end edge of the nipple, and a pipe whose end is within said bushing and whose end edge portions are flanged and held between the opposing beveled surfaces of said nipple and bushing, the thread on said nipple and the thread on said bushing being of different pitch and of the same hand and the threads on said nut corresponding therewith, so that the nut on the final tightening of the joint may be given a slight extra turn and thus serve as a lock-nut.

4. A pipe joint coupling comprising a tubular member having a threaded exterior and outer inwardly extending beveled end edge, an internally threaded nut screwed on said member, an externally threaded bushing screwed into said nut and having an inner outwardly extending beveled end edge, and a pipe whose end is within said bushing and whose end edge portions are flared outwardly and held between the opposing beveled surfaces of said member and bushing, said end edge of said member being beveled on convex lines so as to afford an annular convex bearing surface against which the bushing may bind the flange of the pipe, and the thread on said member and the thread on said bushing being of different pitch and of the same hand and the threads on said nut corresponding therewith, so that the nut on the final tightening of the joint may be given a slight extra turn and thus serve as a lock-nut.

Signed at New York city, in the county of New York and State of New York, this 13th day of March A. D. 1917.

REUBEN R. ROW.
HOWARD C. DAVIS.

Witnesses:
CHAS. C. GILL,
ARTHUR MARION.